Figure 1:
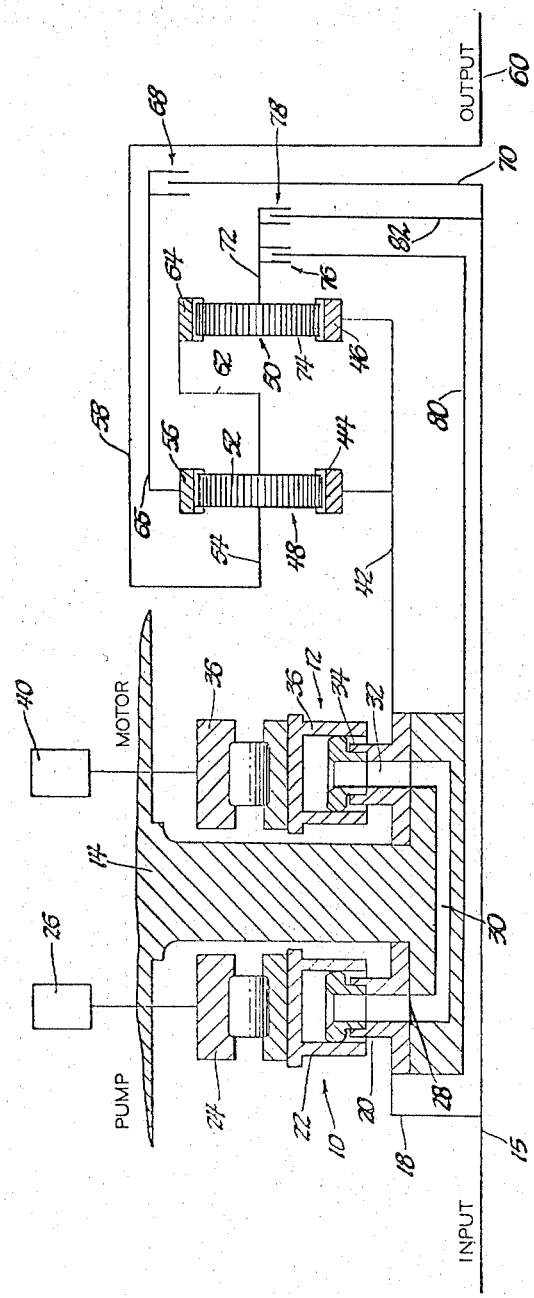

United States Patent [19]

Mooney, Jr. et al.

[11] 3,777,593

[45] Dec. 11, 1973

[54] MULTI-RANGE COAXIAL HYDROMECHANICAL TRANSMISSION

[75] Inventors: James J. Mooney, Jr.; James C. Polak, both of Indianapolis, Ind.

[73] Assignee: General Motors Corporation, Detroit, Mich.

[22] Filed: Nov. 22, 1971

[21] Appl. No.: 200,919

[52] U.S. Cl. ................................ 74/687
[51] Int. Cl. ............................ F16h 47/04
[58] Field of Search .......................... 74/687

[56] References Cited
UNITED STATES PATENTS

| | | | |
|---|---|---|---|
| 2,901,922 | 9/1959 | Baker | 74/687 |
| 3,283,612 | 11/1966 | Densham | 74/687 |
| 3,405,573 | 10/1968 | Takekawa | 74/687 |
| 3,489,035 | 1/1970 | Giles | 74/687 |
| 3,489,036 | 1/1970 | Cockrell et al. | 74/687 |
| 3,511,111 | 5/1970 | Eickmann | 74/687 |

Primary Examiner—Arthur T. McKeon
Attorney—W. E. Finken et al.

[57] ABSTRACT

A multi-range hydromechanical transmission in which the hydraulic pump and motor, the planetary gear set and the clutches are coaxially aligned with the input and output shafts. The transmission provides a fully hydrostatic low, forward and reverse range and two hydromechanical higher speed forward ranges. The range changes are made with substantial synchronization of the hydraulic motor during the change.

7 Claims, 2 Drawing Figures

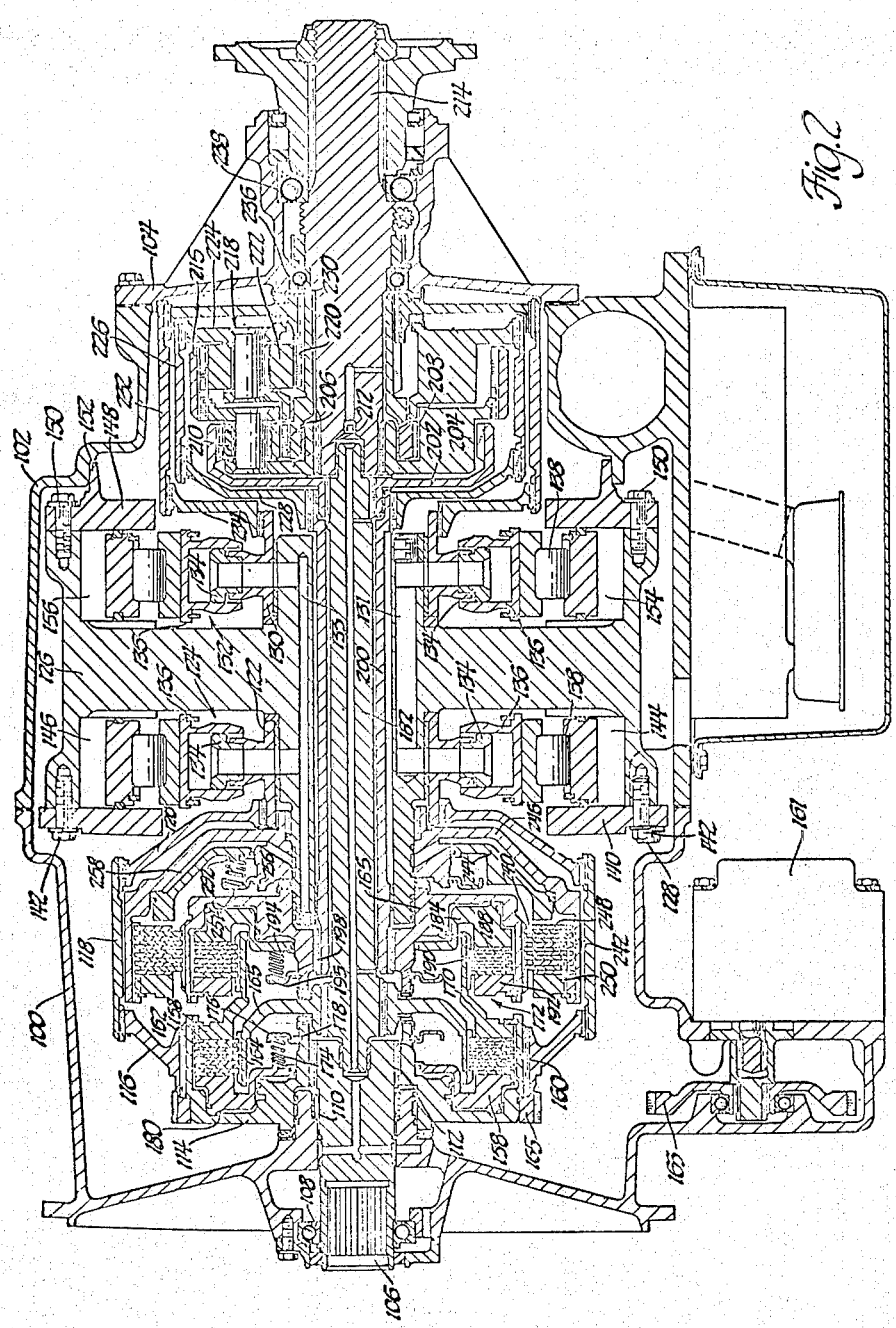

MULTI-RANGE COAXIAL HYDROMECHANICAL TRANSMISSION

This invention relates to hydromechanical transmissions and more particularly to hydromechanical transmissions having the input and output members coaxially aligned with the hydraulic and gearing members.

Prior art devices such as Mooney, Jr. et al. U.S. Pat. No. 3,426,621 provide multi-range hydrochemical transmissions, however, the mechanical input to the planetary gearing is not arranged coaxially with the hydrostatic input and output shafts of the transmission. The present invention provides a coaxial arrangement of all of the drive components of the transmission including the input and output shafts.

It is therefore an object of this invention to provide an improved hydromechanical transmission having a plurality of drive ranges in which the hydrostatic drive components and the mechanical drive components are coaxially arranged with the input shaft of the transmission.

It is another object of this invention to provide in an improved hydromechanical transmission a hydrostatic pump and motor unit coaxially arranged with the transmission input shaft, a planetary gearing system having two members secured to the motor and a plurality of control devices for the planetary gearing coaxially aligned with the input shaft and selectively operable to provide a plurality of drive ranges.

It is another object of this invention to provide in an improved hydromechanical transmission a variable displacement pump and a motor through both of which coaxially extends one or more shaft members which are connected with friction devices which are selectively operable to control a plurality of gear ratios in a planetary gearing arrangement.

These and other objects and advantages will be more apparent from the following description and drawings in which:

FIG. 1 is a schematic diagram of a transmission; and
FIG. 2 is an elevational cross-section of a transmission.

Referring to FIG. 1 there is shown a radial type fluid unit 10 and a radial type fluid unit 12 both of which are rotatably disposed in a stationary housing 14. The unit 10 is drivingly connected to an input shaft 16 by a hub 18 which is connected to the pistons 20. A plurality of cylinders 22, which are supported on a roller bearing, generally designated, 24 at the outer periphery thereof, are reciprocably slidably mounted on the pistons 20. The bearing 24 is supported in the housing 14 and is controllable by a conventional servo mechanism 26 to control the displacement of the unit 10. The unit 10 may serve as a pump or motor depending upon the direction of fluid flow. Fluid is delivered to and from the unit 10 through a passage 28 in the piston 20 and a passage 30 in the housing 14 to a passage 32 in a piston 34 of the unit 12. Another passage, similar to passage 30, provides flow in the opposite direction. The unit 12 is similar in construction to the unit 10 and includes a plurality of cylinders 36 which are positioned by a roller bearing, generally designated, 38 which is supported in the housing 14. The position of the bearing 38 is controlled by a conventional servo 40 to permit variable displacement of the unit 12. The unit 12 may also serve as a pump or motor, therefore, for the purpose of discussion, the unit 10 will be referred to as a pump and the unit 12 as a motor. The pump 10 and motor 12 may be constructed similar in design to the hydraulic unit shown in U.S. Pat. No. 3,274,946 issued to Simmons on Sept. 27, 1966. The above description of the pump and motor and a more detailed description of operation thereof may be supplemented by reference to the Simmons patent. The pump 10 and motor 12 may also be made similar to many of the other commercial hydraulic units presently available.

The hydraulic motor 12 is drivingly connected by a shaft 42 to a pair of sun gears 44 and 46 which are components in planetary gear sets generally designated 48 and 50 respectively. The planetary gearing 48 has a pinion gear 52 rotatably mounted on a carrier 54 and meshing with the sun gear 44 and a ring gear 56. The carrier 54 is connected through a drive hub 58 with an output shaft 60 and through another hub 62 with a ring gear 64 of the planetary gear set 50. The ring gear 56 is connected through a hub 66 to a selectively engageable fluid operated clutch, generally designated 68. The clutch 68 is also drive connected through a hub 70 with the input shaft 16.

The planetary gearing 50 includes a carrier 72 rotatably supporting pinion gears 74 which mesh with the sun gear 46 and the ring gear 64. The carrier 72 is connected to a selectively engageable fluid operated brake, generally designated, 76 and to a selectively engageable fluid operated clutch, generally designated, 78. The brake 76 is connected through a shaft 80 with the stationary housing 14, while the clutch 78 is connected via a hub 82 with the input shaft 16. The clutches 68 and 78 and brake 76 are fluid operated disc type friction devices which are selectively operable to establish various drive ratios in the gear sets 48 and 50. These clutches and brake may be controlled by a hydraulic system such as that disclosed in U.S. Ser. No. 834,097, now U.S. Pat. No. 3,592,281, filed June 17, 1969 in the names of Christenson and Utter and assigned to the assignee of this application.

The hydromechanical transmission described above provides a fully hydrostatic low, forward and reverse range of operation. Low range is provided by engaging the brake 76 thereby holding the carrier 72 stationary so that when the pump 10 is driven by the input shaft 16 fluid is delivered to the motor 12 to cause the motor to be driven in a clockwise or counterclockwise direction of rotation, when viewed from the input shaft 16. With the brake 76 engaged and the motor 12 driven in the counterclockwise direction the ring gear 64 and therefore the output shaft 60 which is connected thereto will be driven in a clockwise direction to provide forward vehicle drive. If the motor 12 is driven in the clockwise direction, the ring gear 64 and the output shaft 60 will, of course, be driven in the opposite direction to provide reverse movement of the vehicle. The direction of rotation of the hydrostatic motor 12 is controlled in the known manner by controlling the displacement of the pump 10 on one side of the other of the center or zero displacement position.

In the forward direction of operation two higher speed ranges, which are hydromechanical, are provided. In the forward direction the displacement of the pump 10 is changed from zero to a maximum displacement thereby causing the fluid motor to be driven from zero to some predetermined speed at which time the ring gear 56 is being driven at a speed substantially equal to the input shaft 16 so that there is relatively little slipping spaced between the components of the clutch 68. Therefore, the clutch 68 may be engaged with very little speed change in its component parts. However, due to the efficiencies of the hydraulic units 10 and 12 and the change in operational function of the units 10 and 12 while changing from one forward drive range to another, the clutch components will undergo some speed change during shifting. When the change is made from first range to second range the clutch 68 and the brake 76 are simultaneously interchanged and the operation of the hydraulic units 12 changes from that of a motor to a pump. In the second range the hydraulic unit 12 is a rotating reaction member for the planetary gearing which permits further increase in the speed of the output shaft 60 by reducing the speed of hydraulic unit 12 which is accomplished by reducing the displacement of the hydraulic unit 10 which functions as a motor. Because of the efficiency changes which occur the speed of the hydraulic unit 12 will increase during the interchange. The proper selection of the displacement of the hydraulic unit 12 and the ratios of the planetary gearings 48 and 50 the speed change in the hydraulic unit 12 can be balanced about the synchronous speed point.

As described above, the output shaft speed is increased in the second range by varying the displacement of the hydraulic unit 10 which reduces the speed of the hydraulic unit 12 to zero in infinitely variable steps. When the speed of unit 12 is zero the dirve is entirely mechanical. The hydraulic unit 10 may be shifted through the zero point to cause the hydraulic unit 12 to begin rotating in the opposite direction further increasing the speed of the output shaft 60. When the hydraulic unit 10 reaches a predetermined maximum displacement in the opposite direction the hydraulic unit 12 will be providing maximum speed to the sun gears 44 and 46 driving the second range of operation. At this time the carrier 72 will be driven at substantially the same speed as the input shaft 16 so that the clutches 68 and 70 may be interchanged at substantially synchronous speeds. As described above, the speed change is not exactly synchronous due to the efficiencies of the hydraulic units. However, as discussed above, with proper selection of the displacement of the hydraulic units of the gear ratios the speed changes can be substantially balanced about the synchronous speed point. With the clutch 78 engaged the displacement of the hydraulic unit 10 is again reduced toward zero thereby causing the speed of the ring gear 64 to increase so that the speed of output shaft 60 increases. The displacement of the hydraulic unit 10 may again be reduced to zero at which point the speed of the hydraulic unit 12 will be zero and the drive is fully mechanical. Further change in the displacement of the hydraulic unit 10 past the zero point the other side of center will cause the hydraulic unit 12 to operate as a motor thereby providing a hydrostatic drive component of the gear set 50 which will serve to increase the speed of ring 64 and the output shaft 60.

It is obvious from the above description and drawing that the gearing arrangement in hydrostatic units are coaxially arranged about the input shaft 16 which is coaxially aligned with the output shaft 60.

The transmission shown in FIG. 2 has a three piece housing including a forward section 100, a central section 102 and a rear end cover 104. The forward section 100 rotatably supports an input shaft 106 on bearings 108 and 110 and includes a spline portion 112 which is drivingly connected to a hub 114. The outer diameter of a hub 114 is splined to another hub 116 which is drivingly connected to an annular member 118. The annular member 118 is drivingly connected to a hub 120 which is splined to a rotor 122 of a fluid pump, generally designated 124. The rotor 122 is rotatably supported on a stationary support member 126 which is secured to the housing portion 102 by a plurality of fasteners 128. Also rotatably supported on the support member 126 is a rotor 130 which is a component in a fluid motor generally designated 132. The support member 126 has a plurality of passages 131 and 133 which provide fluid communication between the pump 124 and the motor 132.

The pump 124 and motor 132 are similar in design to the pump and motor described above for FIG. 1 and each includes a plurality of piston portions 134 secured to the rotor 122, a plurality of cylinders 135 which are slidably mounted on the pistons 134 and are rotatably supported in the support member 126 by roller bearings 138. An end plate 140 is secured to the support member 126 by a plurality of fasteners 142 and cooperates therewith to form a pair of chambers 144 and 146 which may be pressurized to move the roller bearing 138 and cylinders 136 of the pump to control the displacement thereof in a well known manner. A second end plate 148 is secured to the support member 126 by a plurality of fasteners 150 and includes an annular extension 152 which provides a radial locating support in the housing 102 for the support member 126. The end plate 148 cooperates with the support member 126 to provide a pair of control chambers 154 and 156 which may be pressurized to control movement of the roller bearings 148 in piston 146 to thereby control the displacement of the motor 132.

The hub 114 slidably supports a piston 158 which forms a portion of a second range clutch, generally designated 160. The second range clutch 160 has a plurality of friction plates 162 and 164 which are alternately spaced and splined to the hub 114 and a hub 166, respectively. A back up plate 168 for the friction plates 162 and 164 forms a portion of a hub 170 which forms the inner component for a third range clutch, generally designated 172. The piston 158 is urged out of abutting relationship with the friction discs 162 and 164 by a plurality of return springs 174 which are held in compression between the piston 158 and a retainer plate 176 which is positioned on the hub 114 by a snap ring 178. Fluid pressure may be admitted to a chamber 180 formed between the piston 158 and the hub 114 to move the piston 158 into engagement with the friction plates 162 and 164 thereby engaging the clutch 160. The hub 166 is splined to an intermediate shaft 182 which in turn is splined to a hub 202 on which is formed a ring gear 204 which is a member of a planetary gear set generally designated 206.

The clutch 172 includes a piston 184 slidably disposed in a hub 186, a plurality of friction plates 188 and 190 which are alternately spaced and splined to the hub 186 and the hub 170 respectively and a backing plate 192 which is splined to the hub 186. The piston 184 is urged out of abutment with the friction plates 188 and 190 by a plurality of return springs 194 which are compressed between the piston 184 and a retainer 196 which is positioned on the hub 186 by a retaining ring 198. The hub 186 is splined to an intermediate sleeve shaft 200.

The planetary gear set 206 also includes a sun gear 208, a plurality of pinion gears 210 and a planet carrier 212 which rotatably supports the pinions 210 and is splined to a transmission output shaft 214. The carrier 212 is also splined to a ring gear 216 which is a component of a second planetary gear, generally designated 218.

The planetary gear set 218 also includes a sun gear 220 secured to the sun gear 206, a plurality of pinion gears 222 and a planet carrier 224 which rotatably supports the pinion gears 222 and is drivingly connected to the sleeve shaft 200 through an annular member 226 and a hub member 228. The sun gears 206 and 220 are drivingly connected to the rotor 130 of the motor 132 through a hub 230, an annular member 232 and another drum 234. Thus, whenever the hydraulic motor is driven the sun gears 206 and 220 will be driven.

The output shaft 214 is rotatably supported in the end cover 104 by a pair of bearings 236 and 238. As is apparent from the drawing the output shaft 214, the intermediate shaft 182, the sleeve shaft 200 and the input shaft 206 are coaxially aligned in the transmission housing.

The hub 186 which is secured to the sleeve shaft 200 is also splined at its outer diameter to a plurality of friction plates 240 which are components in a low brake, generally designated 242. The low brake 242 also includes a piston 244 slidably disposed in a housing 246 which is splined to the stationary support member 126, a plurality of friction plates 248 which are splined to the housing 246 and a back up plate 250 which is also splined to the housing 246. The piston 244 is urged out of abutting relationship with the friction plates 240 and 248 by a plurality of return springs 252 which are compressed between the piston 244 and a retainer 254 which is located on the housing 246 by a retainer ring 256. The piston 244 is moved into engagement by admitting fluid pressure to a chamber 258 formed between the piston 244 and the housing 246.

The brake 242 and the clutches 160 and 172 are fluid operated friction devices and may be controlled by several of the known hydraulic control systems designed to control such clutches or by the control system discussed above for FIG. 1, namely, United States Serial No. 834,097. Fluid pressure for the control system is splined by a conventional positive displacement pump 161 which is drivingly connected to a gear 163 which is driven through an idler gear, not shown, by a gear 165 secured to the hub 114. Since the hub 114 is driven by the input shaft the control pump 160 will be continuously driven whenever the input shaft 106 is driven.

The operation of the transmission shown in FIG. 2 is the same as that disclosed above for FIG. 1 so that a repetition of the description of operation is not believed to be necessary.

Obviously, many modifications and variations of the present invention are possible in light of the above teachings. It is, therefore, to be understood that within the scope of the appended claims the invention may be practiced otherwise than as specifically described.

What is claimed is:

1. A hydromechanical transmission comprising in combination; an input shaft; an output shaft; fluid pump means coaxially drivingly connected with said input shaft; fluid motor means in fluid communication with said fluid pump means and having an output member concentric to said input shaft; planetary gearing means coaxial with said input shaft including first and second sun gears, first and second ring gears, first and second planet carriers, a plurality of pinion gears rotatably mounted in the first carrier and being in mesh with the first sun gear and first ring gear, and a plurality of pinions rotatably mounted in the second carrier and being in mesh with said second sun gear and said second ring gear said sun gears being drive connected with said output member, said first planet carrier and said second ring gear being drive connected with said output shaft; first and second clutch means coaxial with and operatively connected to said input shaft and being selectively engageable for providing a drive connection to said first ring gear and said second planet carrier respectively; and brake means coaxial with and operatively connected to said second planet carrier and being selectively operable for preventing rotation thereof.

2. A hydromechanical transmission comprising in combination; variable displacement hydraulic transmission means including a hydraulic pump device, a hydraulic motor device in fluid communication with said hydraulic pump device; and displacement control means for controlling the displacement of one of said hydraulic devices for varying the torque ratio; an input shaft drivingly connected with said hydraulic pump device and extending coaxially with said hydraulic pump device and said hydraulic motor device; an output shaft axially aligned with said input shaft; planetary gearing means coaxial with said input shaft including six members with the first and second members drivingly connected with said hydraulic motor device, and third and fourth members drivingly connected with said output shaft; first clutch means coaxial with said input shaft and selectively operable to connect the fifth member of said gearing means with said input shaft; second clutch means coaxial with said input shaft and selectively operable to connect the sixth member with said input shaft; and brake means selectively operable to connect the sixth member to a non-rotating portion of said transmission.

3. A hydromechanical transmission comprising in combination; variable displacement hydraulic pump means; pump displacement control means for controlling the pump; variable displacement hydraulic motor means in fluid communication with said variable displacement hydraulic pump means and having an output member; motor displacement control means for controlling the motor displacement; an input shaft drivingly connected with said variable displacement hydraulic pump and extending coaxially with said variable displacement hydraulic pump means and said variable displacement hydraulic motor means; an output shaft axially aligned with said input shaft; planetary gearing means coaxial with said input shaft including two sun gear members drivingly connected with said output member of said variable displacement hydraulic motor means, a first carrier member and a first ring gear member drivingly connected with said output shaft a second arrier member, a second ring gear member, first pinion gear means rotatably mounted in said first carrier and meshing with one sun gear member and said first ring gear member, and second pinion gear means rotatably mounted in said second carrier member and meshing with the other sun gear member and said second ring gear member; first clutch means coaxial with said input shaft and selectively operable to connect the second ring gear of said gearing means with said input shaft; second clutch means coaxial with said input shaft and selectively operable to connect the second carrier member with said input shaft; and brake means selectively operable to connect the second carrier member to a non-rotating portion of said transmission.

4. A hydromechanical transmission comprising in combination; variable displacement hydraulic transmission means including variable hydraulic pump means, hydraulic motor means in fluid communication with said hydraulic pump means, and displacement control means for controlling the speed and torque ratio of the transmission; an input shaft drivingly connected with said hydraulic pump means and extending coaxially with said variable displacement hydraulic pump means; said hydraulic motor means having an output member; an output shaft axially aligned with said input shaft; planetary gearing means coaxial with said input shaft including two sun gear members drivingly connected with said output member of said hydraulic motor means, a first carrier member and a first ring gear member drivingly connected with said output shaft, a second carrier member, ring gear member, first pinion gear means rotatably mounted in said first carrier and meshing with one sun gear member and said first ring gear member, and second pinion gear means rotatably mounted in said second carrier member and meshing with the other sun gear member and said second ring gear member; first clutch means coaxial with said input shaft and selectively operable to connect the second ring gear of said gearing means with said input shaft; second clutch means coaxial with said input shaft and selectively operable to connect the second carrier member with said input shaft; and brake means selectively operable to connect the second carrier member to a non-rotating portion of said transmission.

5. A hydromechanical transmission comprising in combination; variable displacement hydraulic transmission means including a housing having a support portion with a central bore; a pump device rotatably mounted on one side of said support portion and having a central bore, a hydraulic motor device rotatably mounted on the other side of said support portion in fluid communication with said hydraulic pump device through said support portion and having a central bore, and displacement control means for controlling the displacement of one of said hydraulic devices for varying the torque ratio; an input shaft drivingly connected with said hydraulic pump device and extending coaxially through said central bores of said hydraulic pump device, and said support portion and said hydraulic motor device; an output shaft axially aligned with said input shaft; planetary gearing means coaxial with said input shaft and on said other side of said support portion including six members with the first and second members drivingly connected by a first sleeve shaft with said hydraulic motor device, and third and foruth members drivingly connected with said output shaft; first clutch means coaxial with said input shaft and selectively operable to connect the fifth member of said gearing means with said input shaft; second clutch means coaxial with said input shaft and selectively operable to connect the sixth member with said input shaft; and brake means selectively operable to connect the sixth member to said support portion including a second sleeve shaft extending between said input shaft and said first sleeve shaft.

6. A hydromechanical transmission comprising in combination; variable displacement hydraulic transmission means including a housing having a support portion with a central bore; a pump device rotatably mounted on one side of said support portion and having a central bore, a hydraulic motor device rotatably mounted on the other side of said support portion in fluid communication with said hydraulic pump device through said support portion and having a central bore, and displacement control means for controlling the displacement of one of said hydraulic devices for varying the torque ratio; an input shaft drivingly connected to and coaxially aligned with said hydraulic pump device; intermediate shaft means extending coaxially through said central bores of said hydraulic pump device, and said support portion and said hydraulic motor device; an output shaft coaxially aligned with said input shaft and said intermediate shaft means; planetary gearing means coaxial with said input shaft and on said other side of said support portion including six members with the first and second members drivingly connected with said hydraulic motor device, and third and fourth members drivingly connected with said output shaft; means for connecting said input shaft to said gearing means including said intermediate shaft means, first clutch means coaxial with said input shaft and selectively operable to connect the fifth member of said gearing means with said input shaft, and second clutch means coaxial with said input shaft and selectively operable to connect the sixth member with said input shaft; and brake menas selectively operable to connect the sixth member to said support portion.

7. A hydromechanical transmission comprising in combination; variable displacement hydraulic transmission means including a housing having a support portion with a central bore; a pump device rotatably mounted on one side of said support portion and having a central bore, a hydraulic motor device rotatably mounted on the other side of said support portion in fluid communication with said hydraulic pump device through said support portion and having a central bore, and displacement control means for controlling the displacement of one of said hydraulic devices for varying the torque ratio; an input shaft drivingly connected with said hydraulic pump device; a sleeve shaft and an intermediate shaft extending coaxially through said central bores of said hydraulic pump device, said support portion and said hydraulic motor device and being coaxially aligned with said input shaft; an output shaft coaxially aligned with said input shaft; planetary gearing means coaxial with said input shaft and on said other side of said support portion including six members with the first and second members drivingly connected with said hydraulic motor device, third and fourth members drivingly connected with said output shaft, the fifth member drivingly connected with said sleeve shaft, and the sixth member drivingly connected with said intermediate shaft; first clutch means coaxial with said input shaft and selectively operable to connect the sleeve shaft with said input shaft; second clutch means coaxial with said input shaft and selectively operable to connect the intermediate shaft with said input shaft; and brake means selectively operable to connect the second sleeve shaft to said support portion.

* * * * *

UNITED STATES PATENT OFFICE
CERTIFICATE OF CORRECTION

Patent No. 3,777,593  Dated December 11, 1973

Inventor(s) James J. Mooney, Jr., James C. Polak

It is certified that error appears in the above-identified patent and that said Letters Patent are hereby corrected as shown below:

Column 1, Line 8, "hydrochemical" should read --hydromechanical--
Column 2, line 68, "spaced" should read --speed--
Column 4, line 18, "135" should read --136--
Column 6, line 61, "arrier" should read --carrier--

Signed and sealed this 6th day of August 1974.

(SEAL)
Attest:

McCOY M. GIBSON, JR.
Attesting Officer

C. MARSHALL DANN
Commissioner of Patents